United States Patent [19]

Challener, IV

[11] Patent Number: 5,751,482
[45] Date of Patent: May 12, 1998

[54] ACHROMATIC POLARIZATION-ROTATING RIGHT-ANGLE PRISM SYSTEM

[75] Inventor: William A. Challener, IV, Grant Township, Minn.

[73] Assignee: Imation Corp., Oakdale, Minn.

[21] Appl. No.: 635,985

[22] Filed: Apr. 22, 1996

[51] Int. Cl.$^6$ ............................ G02B 5/30; G02B 5/04
[52] U.S. Cl. ........................ 359/487; 359/485; 359/834
[58] Field of Search ........................... 359/483, 485, 359/487, 488, 496, 834

[56] References Cited

U.S. PATENT DOCUMENTS

| 4,252,410 | 2/1981 | Jain | 359/487 |
|---|---|---|---|
| 4,822,150 | 4/1989 | Duarte | 359/487 |

FOREIGN PATENT DOCUMENTS

| 0 600 728 A1 | 6/1994 | European Pat. Off. |
|---|---|---|
| 1657935 A1 | 6/1991 | U.S.S.R. |

OTHER PUBLICATIONS

"How to Flip the Polarization of Infrared Laser Beams," Keilmann, *Optics Communications*, vol. 14, No. 2, Jun. 1975, pp. 236–237.

"Design of a high–power Nd:YAG Q–switched laser cavity," Singh et al., *Applied Optics*, vol. 34, No. 18, Jun. 20, 1995, pp. 3349–3351.

"Polarization flipper for infrared laser beams: comment," Klein, *Applied Optics*, vol. 16, No. 6, Jun. 1977, p. 1489.

"Novel Prism for use in Scanning Systems," Klein, *Applied Optics*, vol. 12, No. 3, Mar. 1973, pp. 616–617.

"Polarization flipper for infrared laser beams," Chraplyvy, *Applied Optics*, vol. 15, No. 9, Sep. 1976, pp. 2022–2023.

"Beam transmission characteristics of a collinear polarization rotator," Duarte, *Applied Optics*, vol. 31, No. 18, Jun. 20, 1992, pp. 3377–3378.

*Primary Examiner*—Ricky D. Shafer
*Assistant Examiner*—Darren E. Schuberg
*Attorney, Agent, or Firm*—Eric D. Levinson

[57] ABSTRACT

An achromatic polarization-rotating right-angle prism system for rotating the plane of polarization of an electric field, E, by 90° while maintaining strict linear polarization at all wavelengths. The direction of travel of the beam may be altered by 90° or the beam may continue on in the same direction and along the same line of travel. One embodiment includes two pairs of right-angle isosceles prisms. The horizontal, H, and vertical components, V, of E each undergo an equal number of s- and p-polarized reflections.

2 Claims, 6 Drawing Sheets

ACHROMATIC POLARIZATION-ROTATING RIGHT-ANGLE PRISM SYSTEM

This invention was made with Government support under Contract No. F30602-95-2-0004 awarded by the United States Department of the Air Force, Rome Laboratory. The Government has certain rights in this invention.

FIELD OF THE INVENTION

The present invention relates generally to methods of rotating the plane of incident light polarization, and more particularly, to the use of right-angle prisms to accomplish this rotation.

BACKGROUND OF THE INVENTION

It is often desirable to have an optical component which enables one to rotate the plane of polarization of a light beam by one-quarter turn, i.e., 90°. For example, consider a disk-shaped optical storage medium having spiral or concentric grooves. A manufacturer of the optical discs may use an optical media tester to evaluate the disk with polarizations that are parallel and perpendicular to the grooves. This test indicates the dependence of data and servo signals upon the incident light polarization.

Although half wave length ($\frac{1}{2}\lambda$) retardation plates have been used to rotate the plane of polarization of the light from a tester incident upon an optical disk, there are at least four disadvantages to using a $\frac{1}{2}\lambda$ plate. First, the wavefront distortion of most commercially available wave plates is generally fairly large (typically $\lambda/4$ at 633 nm), which reduces the quality of the focused spot. Second, the wave plate itself must be chosen for the precise laser wavelength, otherwise it will introduce a spurious phase shift into the light polarization, converting it to elliptical polarization. This not only limits the accuracy of the test results, but can also mismatch the phase shift in the medium to that of the tester read channel. Both of these effects (wavefront distortion and spurious phase shift) reduce the measured carrier-to-noise ratio (CNR) of the medium in the tester. A third problem with a half wave plate is that multiple wave plates must be purchased for a media tester designed to operate at multiple laser wavelengths. This can be very expensive. While there are half wave retarders advertised to exhibit approximately half wave retardation over a range of wavelengths (e.g., Fresnel rhombs), their actual retardation deviates significantly from half wave over any substantial wavelength range, making them unsuitable for this use in a media tester. The fourth problem is that half wave plates must be carefully aligned in their angular orientation, and their face must be perpendicular to the incident beam. Otherwise, the retardation of the wave plate will be incorrect for rotating the polarization without introducing ellipticity.

Another application for an optical component capable of rotating the plane of polarization by 90° is in the area of polarizing interferometers. An achromatic polarization-rotating retroreflector is a key component of a polarizing, i.e., Martin-Puplett, interferometer. Presently, such interferometers are useful only for spectroscopy in the far infrared. At the extremely long far infrared wavelengths, metallic mirrors act essentially as perfect mirrors without significantly depolarizing the incident light. As a result, a simple roof mirror oriented at a 45° angle to the plane of polarization of the incident beam is sufficient to rotate the polarization by 90° and retroreflect the beam. Michelson (nonpolarizing) interferometers are now standard commercial products for Fourier transform spectroscopy from the mid infrared through the visible because interferometers often have advantages over monochromators in spectroscopic applications in throughput, multiplexing capability, and resolution. However, the significant depolarizing effects of metallic mirrors at the shorter visible and near infrared wavelengths preclude the use of roof mirrors in polarizing interferometers at these wavelengths.

SUMMARY OF THE INVENTION

It would be desirable to have a polarization-rotating optical element in which the exiting beam does not travel in the opposite direction from the entering beam, but rather travels perpendicular to (i.e., at 90°) and undisplaced from the entering beam. This is advantageous because it allows one to use the optical element interchangeably with a mirror oriented at 45° to the entering beam so that the optical element and mirror may each be used to evaluate an optical disk with polarizations that are both parallel (e.g., with the optical element) and perpendicular (e.g., with the mirror) to the grooves on the disk. Because the optical element must be interchangeable with the mirror, it is essential that the beam exiting the optical element not be displaced from the entering beam.

It would also be desirable to have a polarization rotating element in which the exiting beam continues along in the same direction and undisplaced from the entering beam. This is advantageous because it allows one to evaluate an optical disk with polarizations that are both parallel and perpendicular to the grooves on the disk simply by placing the optical element in the path of the beam (for one polarization) and removing the optical element from the path of the beam (for the other polarization). Because the beam must travel along the same path regardless of whether the optical element is present or not, it is essential that the optical element not displace the exiting beam from the beam's original path.

In either of the cases discussed above (i.e., where the orientation of the beam is rotated 90° or continues along its original path), it would be desirable that the optical element perform its function independent of the orientation of the optical element with respect to the entering beam. (Although the optical element may function even though rotated through 360°, the entering beam should be perpendicular to the face of the optical element that it must enter.) This greatly simplifies the installation and alignment of the optical element. The present invention also provides an achromatic polarization rotator which maintains strict linear polarization at all wavelengths.

One embodiment of the present invention includes the pair of prisms shown in FIGS. 2 and 3 as well as a second pair of right-angle isosceles prisms as shown, for example, in FIG. 1. The first pair of prisms includes one prism having a length a with sides having a width b and a second prism having a length b with sides having a width a. The base of the second prism is on top of and coextensive with a side of the first prism.

The second pair of prisms (see FIG. 1) includes a prism (the "third" prism) having a length b with sides having a width a/2. The other prism (the "fourth" prism) has a length a/2 with sides having a width b. The third prism is adjacent the first prism such that a side of the third prism is coextensive with the half of the side of the first prism that is not coextensive with the second prism. The apex of the third prism is coextensive with one end of the first prism. The fourth prism is adjacent the first prism such that a side of the fourth prism is coextensive with the remaining half of the side of the first prism which is coextensive with the third prism. The apex of the fourth prism is coextensive with an edge of said side of the first prism opposite the apex of the first prism.

The present invention also includes a method of rotating the plane of polarization of an electric field, E, of an incident beam by 90° while altering the direction of the beam by 90°. The method includes providing a first pair of prisms as described above for FIGS. 2 and 3. A beam having a plane of polarization of an electric field, E, travels in an initial ("first") direction toward a first portion of one side of the first prism which is not coextensive with the second prism so that the incident beam is normal to that side of the first prism. The plane of polarization of E is oriented at an angle θ with respect to a plane ("the first plane") which is defined as bisecting the prism assembly through the apex of the second prism. The plane of polarization of E is reflected across the first plane by an angle of −θ. The plane of polarization of E is reflected across another plane ("the second plane") which is oriented at an angle of 45° with respect to the first plane. The direction of travel of the beam is altered 90° so that it emerges traveling at an angle of 90° from its initial angle. Thus, the plane of polarization is rotated 90° from its original orientation and the direction of travel of the beam is also altered 90° from its initial direction. (See FIG. 1.)

Ease of alignment of the optical elements is insured by arranging the reflections such that the vertical, V, and horizontal, H, components of E undergo an equal number of s-polarized reflections and undergo an equal number of p-polarized reflections. In the embodiment of the invention shown in FIG. 1, the number of s-polarizations for H and V is three each, and the number of p-polarizations for H and V is also three each. The steps of reflecting the polarization across the second plane and rotating the first direction of travel of the beam may be accomplished by providing the third and fourth prisms discussed above and shown as prisms 70 and 80 in FIG. 1.

The present invention also includes a method of rotating the plane of polarization of E of an incident beam by 90° while allowing the beam to continue along undisplaced and in the same direction of travel. One version of this method (see FIG. 6) includes the prism assembly described above and shown in FIGS. 2 and 3. The beam has a plane of polarization of E and travels in a first direction toward and normal to the side of the first prism which is not coextensive with the second prism. The plane of polarization of E is oriented at an angle θ with respect to a plane ("the first plane") which bisects the prism assembly (assembly 10) through the apex (44) of the second prism (40). The plane of polarization of E is reflected across the first plane to an angle −θ.

The beam undergoes three separate displacements which result in a net displacement of zero. (See FIGS. 7A–C.) One displacement moves the beam in one direction, e.g., horizontally, by a distance of $a/(2\sqrt{2})$, where a is the length of the first prism (prism 20 in FIGS. 2 and 3). The beam undergoes another displacement in a perpendicular direction, e.g., vertically, by an equal distance, i.e., $a/(2\sqrt{2})$. The beam undergoes a third displacement in a direction equal and opposite to the sum of the other two displacements, i.e., at an angle of −135° (180°−45°), and a distance of a/2, since $$\left(\frac{a}{2}\right)^2 = \left(\frac{a}{2\sqrt{2}}\right)^2 + \left(\frac{a}{2\sqrt{2}}\right)^2.$$

Thus, the net displacement is zero.

The beam also undergoes two retroreflections, the sum of which allow the beam to continue on in its original direction. At the first retroreflection, the plane of polarization is reflected across a first plane. At the second retroreflection, the plane of polarization is reflected across a second plane which is at 45° to the first plane. Two reflections are equivalent to a rotation at twice the angle between the planes, or 90°. As was the case above, V and H undergo an equal number of s-polarized reflections and undergo an equal number of p-polarized reflections. In the embodiment shown in FIG. 6, the number of s-polarizations for H and V is four each, and the number of p-polarizations for H and V is also four each.

Another method for rotating the plane of polarization of E of an incident beam by 90° while allowing the beam to continue along undisplaced and in the same direction includes the following steps. The beam is directed toward a portion of an optical assembly (e.g., as shown in FIG. 6). The plane of polarization of E is reflected across a first plane which bisects H and V. H and V each undergo two s-polarized and two p-polarized reflections. The plane of polarization of E is then reflected across a second plane which is oriented at 45° with respect to the first plane. H and V each undergo two s-polarized and two p-polarized reflections. The beam is retroreflected two times so that the beam continues along in its original direction. The total number of s-polarized reflections is the same for V and H, and the total number of p-polarized reflections is also the same for V and H, thereby maintaining the linear polarization of the incident beam. In one embodiment, the method includes displacing the beam in a direction ("the second direction") perpendicular to its direction of travel by a distance x. The beam also is displaced by a distance x in a direction ("the third direction") perpendicular to the direction of travel and the second direction. The beam is also displaced in a direction ("the fourth direction") which bisects the second and third directions by a distance $-\sqrt{2}x$, so that the net effect of the three displacements is zero.

The present invention includes yet another method for rotating the plane of polarization of E while allowing the beam to continue undisplaced. The beam travels in a first direction toward and normal to a portion of an optical assembly (e.g., FIGS. 8 or 11). The beam is reflected to a second direction which is perpendicular to the first direction and is then reflected to a third direction which is normal to a plane defined by the first two directions. H and V each undergo one s-polarized and one p-polarized reflection. The beam is retroreflected from a third to a fourth (opposite) direction and the plane of polarization of E is reflected across a plane which bisects H and V. H and V each undergo two s-polarized and two p-polarized reflections. The beam is then reflected to a fifth direction opposite the second direction and then reflected back along the first direction. H and V each undergo one s-polarized and one p-polarized reflection. In one embodiment, the beam is displaced by a distance x in the second direction and also by a distance x in the fifth direction, so that there is no net displacement of the beam.

DETAILED DESCRIPTION

Figure 1:
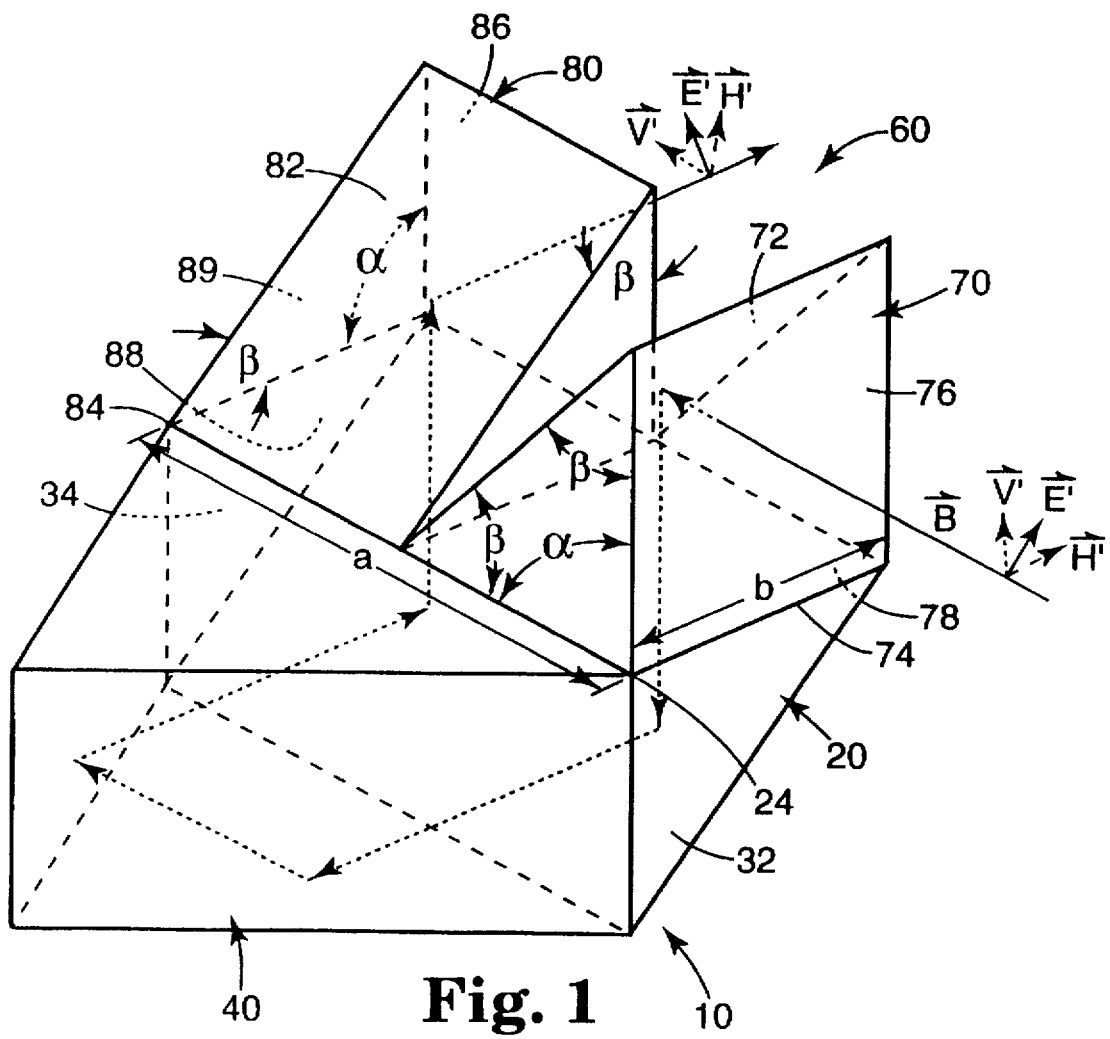
FIG. 1 is an isometric view of one embodiment of the present invention for rotating the plane of polarization by 90° while altering the direction of the incident light beam by 90°.

One embodiment of the present invention rotates the plane of polarization of an incident beam by 90° and alters the direction of the beam by 90°. This is shown in FIG. 1 as assembly 60 which is comprised of assembly 10 and right angle isosceles prisms 70 and 80.

Figure 2:
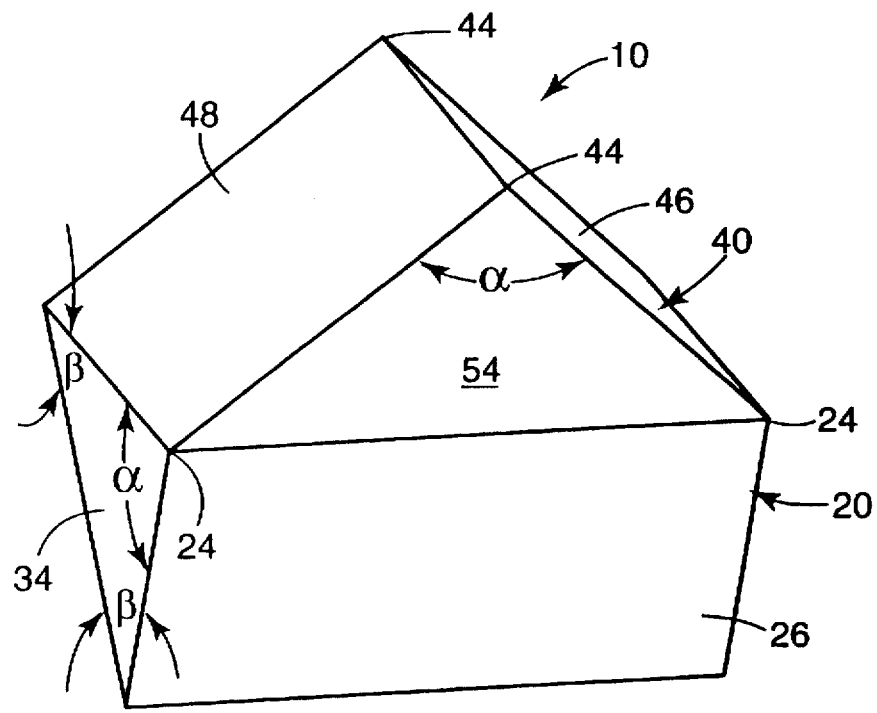
FIG. 2 is an isometric view of an assembly of two right-angle prisms for rotating the plane of polarization of incident light by 90°.
Figure 3:
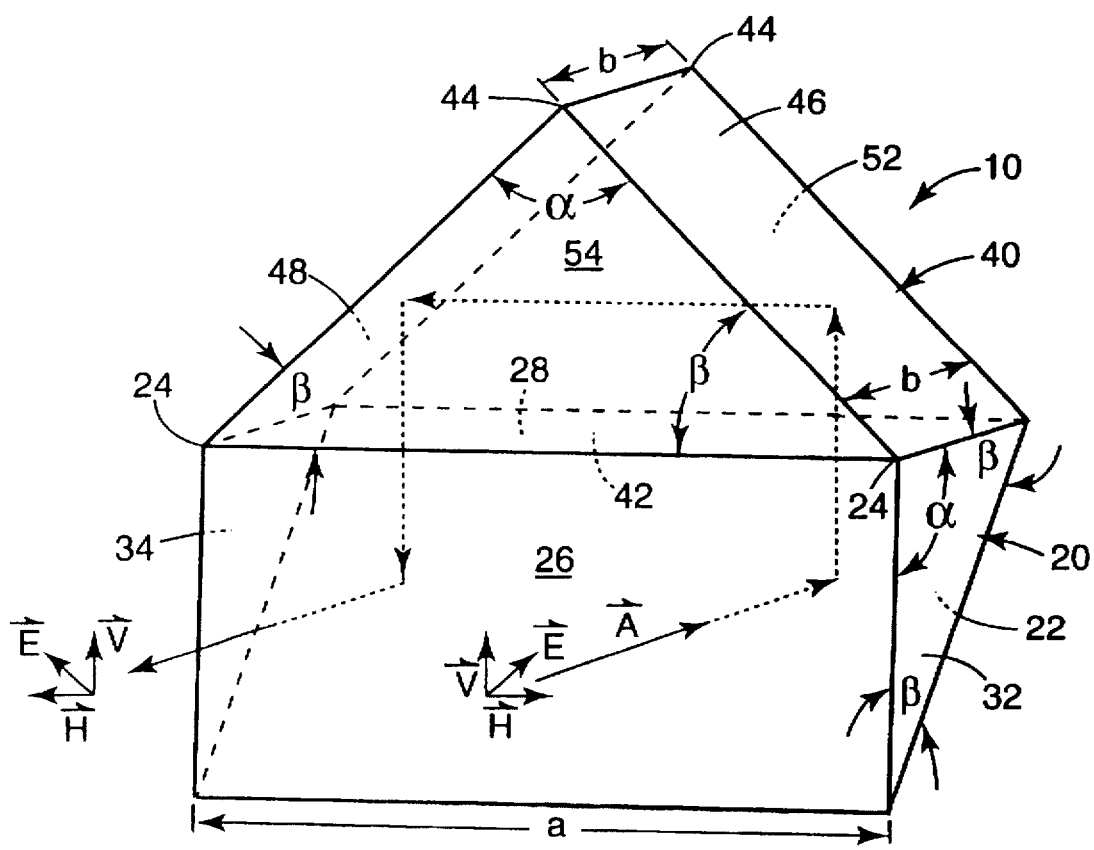
FIG. 3 shows the path of a light ray through the assembly shown in FIG. 2.

As shown in FIGS. 2 and 3, prism assembly 10 comprises first right-angle isosceles prism 20 and second right-angle isosceles prism 40. Prism 20 has a rectangular base 22 opposite angle α at the apex 24 of the prism. Because prism 20 is a right-angle prism, angle α=90°. Prism 20 has rectangular sides 26 and 28, which are perpendicular to each other, since the prism is a right-angle prism, and which each form an angle β of 45° with respect to base 22, since the prism is an isosceles prism. Prism 20 has opposite, parallel, right-angle isosceles triangle ends 32 and 34.

Second prism 40 has a rectangular base 42 opposite angle α at apex 44 of the prism. Because prism 40 is also a right-angle prism, angle α=90°. Prism 40 has rectangular sides 46 and 48, which are perpendicular to each other, since the prism is a right-angle prism, and which each form an angle β of 45° with respect to base 42, since the prism is an isosceles prism. Prism 40 has opposite, parallel, right-angle isosceles triangle ends 52 and 54.

Prism 40 is placed on top of prism 20 so that base 42 of prism 40 is coextensive with side 28 of prism 20. Thus, the length of side 28 of prism 20, designated as a, is equal to the width of base 42 of prism 40. Similarly, the width of side 28 of prism 20, designated as b, is equal to the length of base 42 of prism 40. Thus, by simple geometry, base 22 of prism 20 has a width of √2 b and prism 20 has a height of (√2/2) b. Similarly, sides 46 and 48 of prism 40 have widths of a and prism 40 has a height of a/2.

Assembly 10 is preferably made of the same materials as those typically used for prisms, e.g., polycarbonate, plastic, or glass. Assembly 10 may be formed as a single piece from the materials described above, or it may be formed by assembling two separate prisms 20 and 40 as shown in FIGS. 2 and 3. If two separate prisms are used, the two prisms should be optically adhered together by a transparent, refractive index-matching adhesive to minimize the possibility of internal reflections at the interface between the two prisms.

The manner in which assembly 10 can be used to rotate the polarization of a beam of incident light by 90° will now be described with reference to a light ray A shown in FIG. 3. Ray A has a polarization field E having a vertical component V, pointing up, and a horizontal component H pointing to the right, as shown in FIG. 3. Assembly 10 should be oriented with respect to ray A such that the plane of polarization of ray A is at a 45° angle with respect to the bottom edge of prism 20. Light ray A enters side 26 of prism 20 toward the right side of side 26, i.e., to the right of apex 44 of prism 40, as shown in FIG. 3. Ray A enters side 26 of prism 20 at an angle normal (i.e., 90°) to the surface of side 26. Ray A proceeds through prism 20 until it is reflected 90° at base 22 (due to total internal reflection and an angle of incidence of 45°). As a result of this first reflection, the vertical component, V, of Ray A experiences a p-polarized reflection and no change in the orientation of V, since light rays having a polarization parallel to the plane of incidence are defined as "p-polarized" and light rays having a polarization perpendicular to the plane of incidence are "s-polarized." (The horizontal component, H, will be discussed later.)

Ray A then passes out of side 28 of prism 20 and thus enters base 42 of prism 40. Ray A proceeds through prism 40 until it is reflected 90° at side 46. As a result of this second reflection, the vertical component, V, of Ray A experiences an s-polarized reflection with no change in the orientation of the vertical component. Ray A then passes through prism 40 until it is reflected 90° at the other side 48 of prism 40, whereupon V experiences a second s-polarized reflection with no change in the orientation of V. Ray A then passes back through base 42 of prism 40 and thus enters prism 20 via side 28. Ray A proceeds through prism 20 until it is reflected 90° at base 22 of prism 20, whereupon V experiences a second p-polarized reflection with no change in the orientation of V. (Please note that the reflected angle is always 90° since α=90°, β=45°, and light ray A enters prism 20 normal to side 26.) Ray A then passes out of prism 20 via side 26 at an angle normal to the surface of side 26.

Thus, as a result of the four reflections, the vertical component, V, of the polarization field E has undergone two p-polarization phase shifts and two s-polarization phase shifts, while the orientation of the vertical component has not been affected.

The four reflections of light ray A discussed above for the vertical component of Ray A will now be discussed with respect to the horizontal component, H, of Ray A. The horizontal component of Ray A is initially oriented toward the right, as shown in FIG. 3. At the first reflection (at base 22 of prism 20), Ray A experiences an s-polarized reflection with no change in the orientation of the horizontal component, H. At the second reflection (at side 46 of prism 40), Ray A experiences a p-polarized reflection and the orientation of H is rotated 90° clockwise (or to the right), so that it points downward. At the third reflection (at side 48 of prism 40), Ray A experiences a second p-polarized reflection and the orientation of H is rotated clockwise by another 90° so that the horizontal component points to the left. At the fourth reflection (at base 22 of prism 20), Ray A experiences a second s-polarized reflection with no change in the orientation of H.

Thus, as a result of the four reflections, the horizontal component, H, of E has undergone two p-polarization phase shifts and two s-polarization phase shifts and the orientation of the horizontal component has shifted 180° from right-pointing to left-pointing.

Because both the vertical and horizontal components of the plane of polarization of the electric field E were each subjected to two s- and two p-polarization phase shifts, no net phase shift between the two components is introduced by prism assembly 10 for any wavelength. Second, because the horizontal component H, of E is reversed (180° change) and the vertical component is not changed, the effect of the prism assembly 10 is to reflect the incident polarization E about the vertical plane. Third, the exiting beam is (a) traveling in the opposite direction from the entering beam, and (b) is displaced from the entering beam (since ray A must be reflected off both sides 46 and 48).

As shown in FIG. 1, prism 70 is optically attached to prism 20 so that side 78 of prism 70 is attached to side 26 of prism 20. Prism 70 is oriented on prism 20 such that apex 74 of prism 70 is aligned with end 32 of prism 20. Thus, side 78 of prism 70 has a length of b (equal to the width of side 26 of prism 20) and a width of a/2 (i.e., equal to one half the length of side 26 of prism 20).

Prism 80 is oriented at an angle of 90° with respect to prism 70 and is positioned on side 26 of prism 20 next to prism 70. Apex 84 of prism 80 is aligned with the edge of side 26 of prism 20 opposite apex 24 of prism 20. Triangular end 89 of prism 80 is aligned with end 34 of prism 20. Thus, side 88 of prism 80 has a length of a/2 (equal to one half the length of side 26 of prism 20) and a width of b (equal to the width of side 26 of prism 20).

The manner in which assembly 60 can be used to rotate the polarization of a beam of incident light by 90° while also altering the direction of the beam by 90° will now be described with reference to a light ray B, as shown in FIG. 1. Ray B has an electric field E' having a vertical component V', pointing up, and a horizontal component H' pointing to the right, as shown in FIG. 1. Ray B enters side 76 of prism 70 at an angle normal (i.e., 90°) to the surface of side 76. Ray B proceeds through prism 70 until it is reflected 90° at base 72 (due to total internal reflection at an angle of incidence of 45°). As a result of this first reflection, the vertical component, V', of Ray B undergoes a p-polarized reflection, and the horizontal component, H', of Ray B undergoes an s-polarized reflection.

Ray B then passes through side 78 of prism 70 and enters prism 20 via side 26 at an angle normal to the surface of side 26. Ray B then undergoes the four reflections within assembly 10 described in FIG. 3. Ray B then passes out of prism 20 via side 26 at an angle normal to side 26 and enters prism 80 via side 88. Ray B proceeds through prism 80 until it is reflected 90° at a base 82. As a result of this last reflection, V' of Ray B undergoes an s-polarized reflection and H' undergoes a p-polarized reflection. Ray B then exits prism 80 via side 86 at an angle normal to side 86.

Thus, as a result of the six reflections, H' and V' have both undergone 3 p-polarization phase shifts and 3 s-polarization phase shifts, V' has rotated 90° and H' has rotated 90°. Because these are orthogonal vectors, both rotated 90° in the same direction, any other vector will also be rotated 90°. Because the number of p- and s-polarized reflections are equal for both V' and H', the light remains linearly polarized.

Although base 82 of prism 80 is shown as facing out of the page on FIG. 1, prism 80 may be rotated 180° so that the base faces into the page, i.e., apex 84 of prism 80 could be aligned with apex 24 of prism 20. In this case, Ray B would exit assembly 60 via prism 80 in the opposite direction (i.e., rotated 180°) from that shown in FIG. 1, although the direction of travel exiting Ray B would still be rotated by 90° (actually, −90° or 270°) from the direction of travel of Ray B prior to entering assembly 60.

Prism assembly 10 can also be combined with other optical elements to allow an optical assembly to, in addition to rotating the plane of polarization of an incident light beam by 90°, allow the reemerging beam to continue on in the same direction as and undisplaced from the original beam. Such an arrangement is shown as optical assembly 100 in FIG. 6. Optical assembly 100 is comprised of prism assembly 10 and beam redirection assembly 120.

Figure 4:
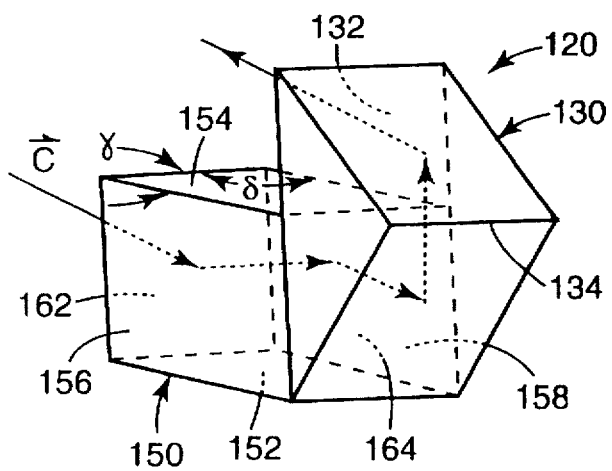
FIGS. 4 and 5 are isometric views showing the path of a light ray through two optical components of the assembly of FIG. 6.

Beam redirection assembly 120 is shown in FIG. 4, with the exception of rectilinear beam conduit 170, which has been omitted. Beam conduit 170 will be discussed later. Assembly 120 is comprised of a right angle isosceles prism 130 and a rhomboid, or a parallelogram-shaped, beam guide 150.

Figure 6:
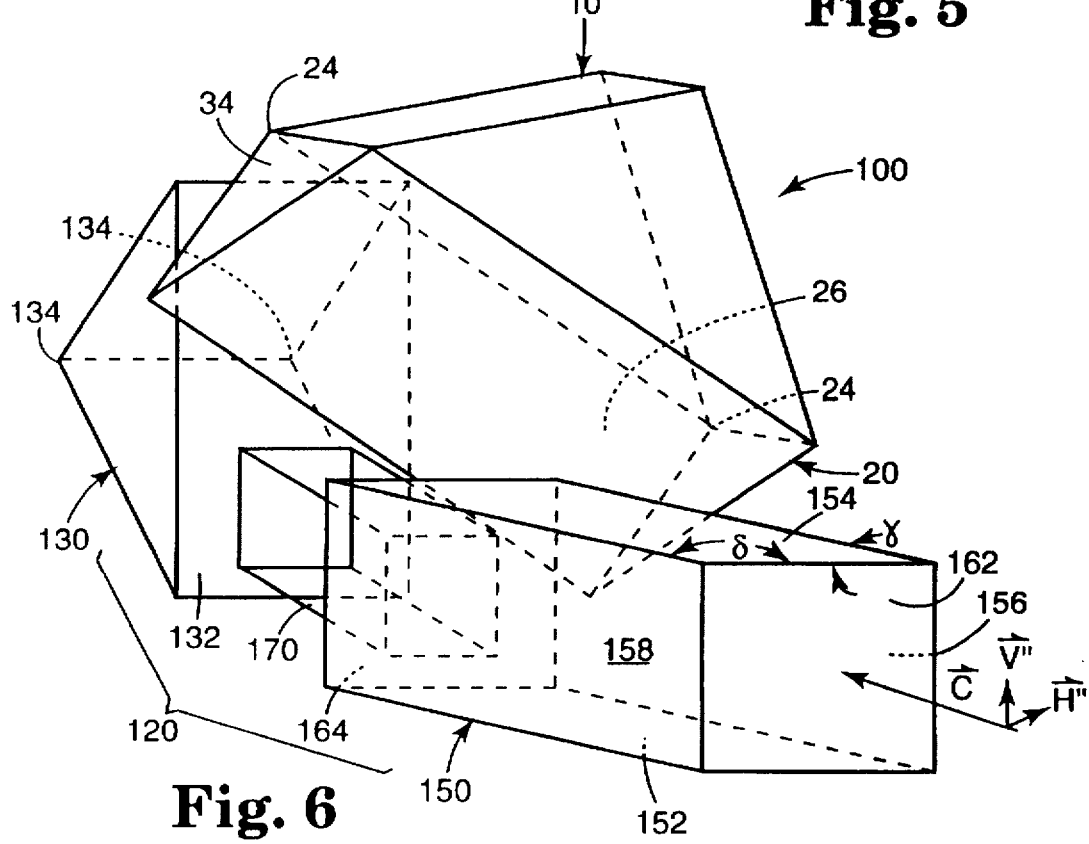
FIG. 6 shows an isometric view of an assembly of the optical components of FIGS. 4 and 5 according to one embodiment of the present invention for rotating the plane of polarization by 90° with no redirection or displacement of the incident light ray.

Rhomboid 150 has interior angles of 45° and 135° for angles γ and δ as shown in FIGS. 4 and 6. Thus, sides 156 and 158 of rhomboid 150 are parallel to each other, ends 162 and 164 are parallel to each other, and top and bottom 154 and 152 are parallel to each other. Sides 156 and 158 are oriented at 45° to ends 162 and 164. As shown in FIG. 4, the surface of end 164 of rhomboid 150 contacts the lower half of base 132 of prism 130.

Figure 7A:
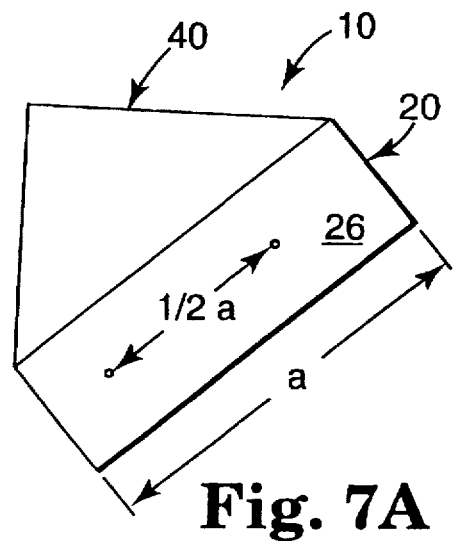
FIGS. 7A–C show the relative dimensions of the optical components of the assembly of FIG. 6.
Figure 7B:
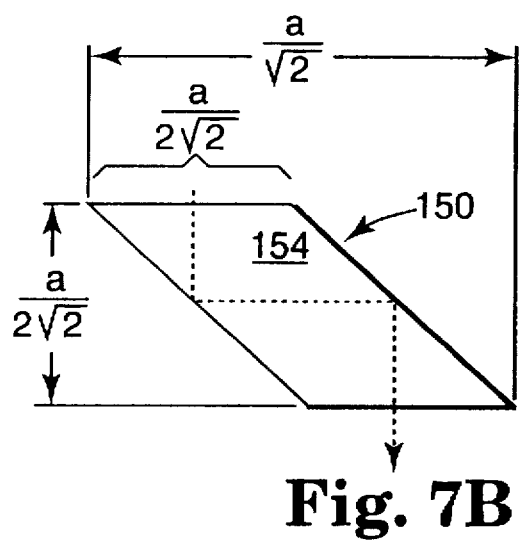
Figure 7C:
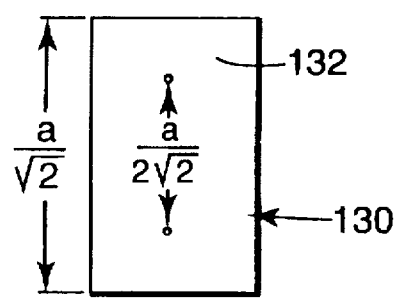

The relative sizes of rhomboid 150, prism 130, and assembly 10 are shown in FIGS. 7A–C. As shown in FIG. 7A, prism 20 of assembly 10 has a length of a (and thus base 42 of prism 40 has a width of a). The entrance and exit points of Ray C are shown on side 26 of prism 20 and are separated by a distance a/2. An overhead plan view of rhomboid 150 is shown in FIG. 7B. Rhomboid 150 has a width of a/(2√2), and a length, perpendicular to the width, also equal to a/(2√2). The path of travel of Ray C within rhomboid 150 is shown in dashed lines. As shown in FIG. 7C, base 132 of prism 130 has a width of a/(2√2). The entrance and exit points of Ray C at base 132 are shown in FIG. 7C and are separated by a distance a/√2.

Figure 5:
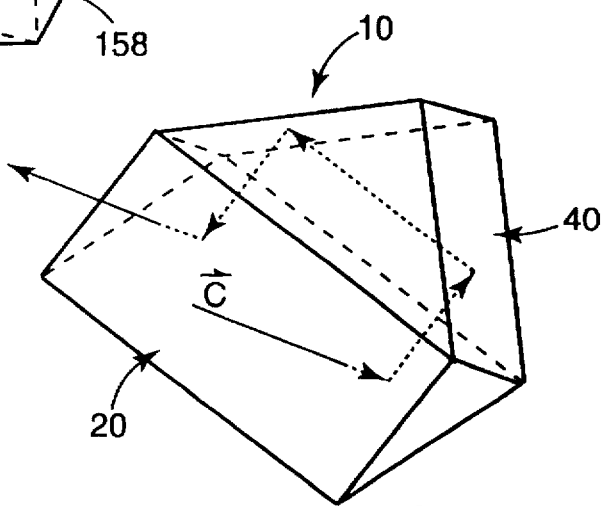

Prism assembly 10 is positioned with respect to beam redirection assembly 120 as shown in FIG. 6. A portion of side 26 of prism 20 is in optically intimate contact with base 132 of prism 130 to allow Ray C exiting prism 130 to enter prism assembly 10. Prism assembly 10 does not contact rhomboid 150. In order to provide the proper orientation of prism assembly 10, as shown in FIG. 6, it is necessary to use an optical connector 170, e.g., having a rectangular (e.g., square) cross-section, to allow Ray C to pass from a rhomboid 150 to prism 130. The ends of optical connector 170 are preferably perpendicular to its length so that the interfaces between the connector and prism 130 and the connector and rhomboid 150 do not affect the transmission, direction, or polarization of Ray C. The orientation of prism assembly 10 with respect to beam redirection assembly 120 should be such that apex 24 of prism 20 is at a 45° angle with respect to apex 134 of prism 130. Prism assembly 10 should also be positioned with respect to prism 130 such that Ray C exiting prism 130 will enter prism assembly 10 and can be reflected as shown in the ray diagram of FIG. 5 and so that Ray C exits prism assembly 10 in the same direction as and along the same line as the original Ray C prior to entering rhomboid 150. This results from the fact that the horizontal displacement of the central light ray by rhomboid 150 and prism assembly 10 cancel each other out, while the vertical displacement of prism 130 and prism assembly 10 also cancel each other out.

The manner in which assembly 100 can be used to rotate the polarization of a light beam by 90° while allowing the re-emerging beam to continue on in the same direction as and undisplaced from the original beam is described as follows. Ray C has a polarization field E" having a vertical component V", pointing up, and a horizontal component, H", pointing to the right, as shown in FIG. 6.

Ray C enters end 162 of rhomboid 150 normal to the surface of end 162. Ray C is then reflected at a 90° angle at side 156 of rhomboid 150 (due to total internal reflection at an angle of incidence of 45°) and is then reflected 90° again at opposite side 158, as shown in FIG. 7B. As a result of these first two reflections, V" undergoes two p-polarized reflections, while H" undergoes two s-polarized reflections.

Ray C then exits rhomboid 150, passes through optical connector 170, and enters prism 130, as shown in FIGS. 4, 6, and 7C. Ray C undergoes two 90° reflections at both sides of prism 130. As a result of these two reflections, V" undergoes two p-polarized reflections, while H" undergoes two s-polarized reflections. V" now points downward, while H" still points to the right. The effect of beam redirection assembly 120 therefore is to retroreflect the incident beam direction, while reflecting the incident polarization about the horizontal plane.

Ray C then exits prism 130 via base 132 and enters assembly 10 via side 26 of prism 20. Ray C then undergoes the four reflections within assembly 10 described for FIG. 3. Ray C then exits prism 20 via side 26 and continues on along the same line as Ray C traveled prior to entering assembly 100, i.e., in the same direction as and undisplaced from the original beam. As previously discussed, prism assembly 10 rotates V" to point to the left, while it rotates H" to point upward. Both V" and H" have been rotated 90° in the same direction, so any other ray will also be rotated by 90°. Both rays undergo a total of 4 p-polarized and 4 s-polarized reflections. Therefore, the light remains linearly polarized.

Figure 8:
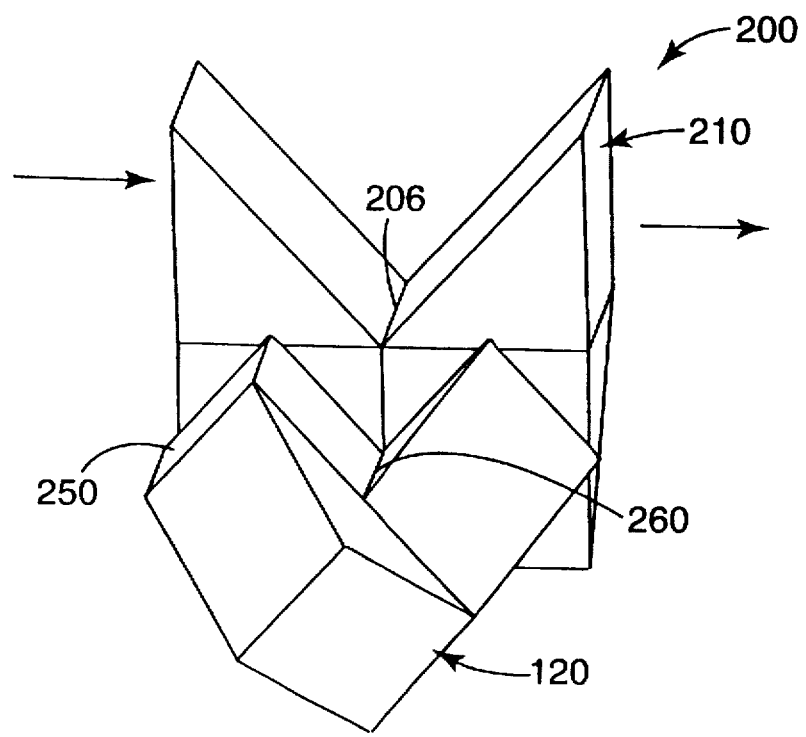
FIG. 8 shows an isometric view of an assembly of optical components according to yet another embodiment of the present invention for rotating the plane of polarization by 90° with no redirection or displacement of the incident light ray.

Another embodiment according to the present invention for rotating the plane of polarization by 90° while allowing the light beam to proceed on in the same direction and undisplaced is shown as optical assembly 200 in FIG. 8. Optical assembly 200 is comprised of optical subassembly 210 and beam redirection assembly 120.

Figure 9:
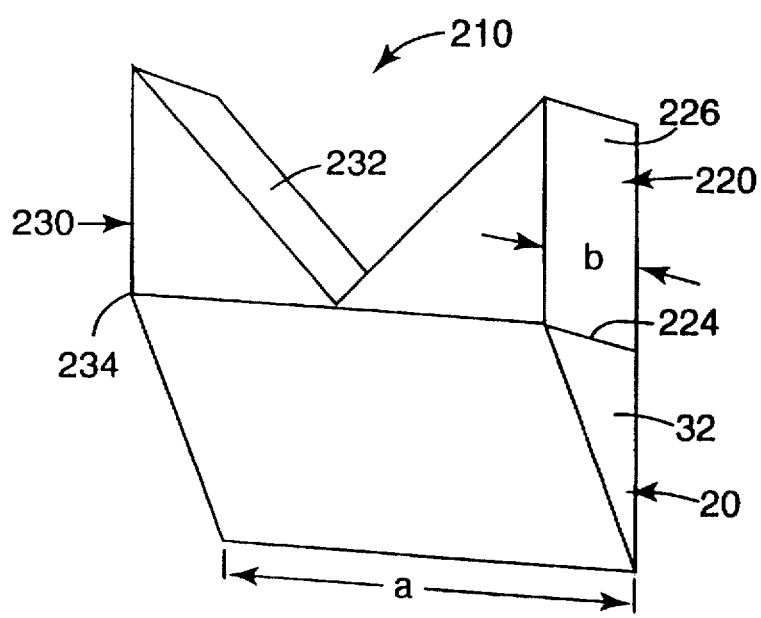
FIG. 9 shows an isometric view of one of the optical components of FIG. 8.

As shown in FIG. 9, optical subassembly 210 is comprised of prism 20 and right-angle isosceles prisms 220 and 230. Prisms 220 and 230 are optically attached to side 26 of prism 20 so that apex 224 of prism 220 shares an edge with end 32 of prism 20 and apex 234 of prism 230 shares an edge with end 34 of prism 20. Thus, prisms 220 and 230 each have a length b (equal to the width of side 26 of prism 20) and have sides 228 and 238, respectively, having widths of a/2 (equal to half the length of side 26 of prism 20).

Figure 10:
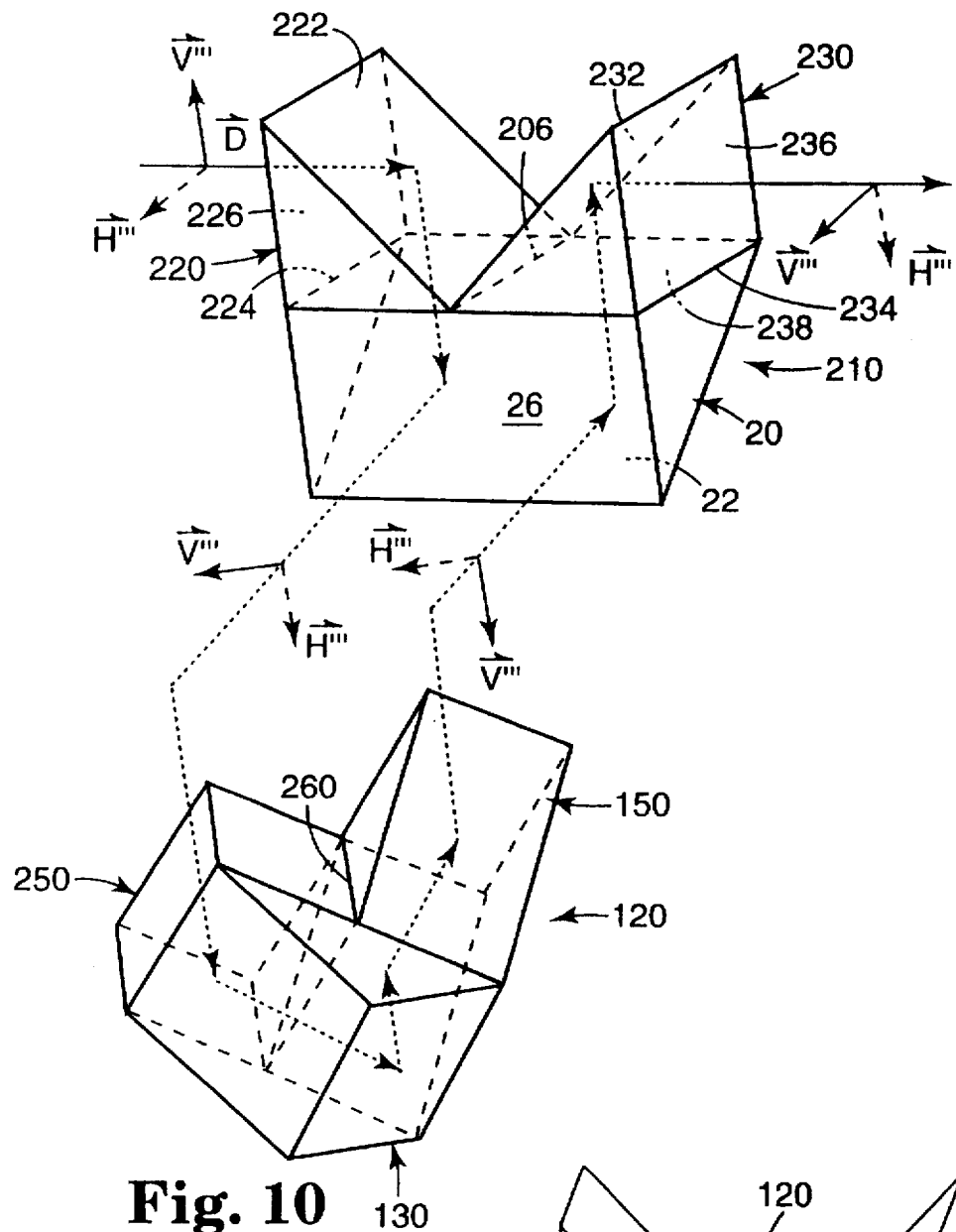
FIG. 10 is an exploded isometric view of the path of a light ray through the assembly shown in FIG. 8.

Beam redirection assembly 120 is shown in FIG. 4. Assembly 120 is optically attached to optical subassembly 210 as shown in FIGS. 8 and 10. In order to minimize disruptions caused by air-optical element interfaces between base 132 of prism 130 and side 26 of prism 20, it is recommended that a cube 250 be provided between side 26 of prism 20 and that portion (usually half) of base 132 of prism 130 which is not occupied by rhomboid 150. Thus, cube 250 has dimensions of one-half of the width of prism 130 as shown in FIGS. 8 and 10. A portion of rhomboid 150 is in contact with cube 250, although this fact is of no significance to the function of beam redirection assembly 120.

Beam redirecting assembly 120 and cube 250 should be positioned on optical subassembly 210 such that V-portion 260 formed by the faces of cube 250 and rhomboid 150 is vertically displaced from an oriented at the same angle (45° with respect to faces 32 and 226) as the V-portion 206 formed by bases 222 and 232 of prisms 220 and 230, respectively.

The manner in which assembly 200 can be used to rotate the polarization of an incident light beam by 90° while allowing the light beam to proceed on in the same direction and undisplaced will now be described with reference to a light Ray D, as shown in FIG. 10. Ray D enters prism 220 normal to the surface of side 226. It undergoes one reflection at base 222 of prism 220 and then enters prism 20. It reflects from base 22 of prism 20 and then enters beam redirection assembly 120. Ray D has a polarization field with vertical component V''' and horizontal component H'''. As a result of these two reflections, V''' is rotated to point left and H''' is rotated to point downwards. V''' first undergoes a p-polarized reflection, then an s-polarized reflection, while H''' undergoes first an s-polarized reflection, then a p-polarized reflection.

As discussed previously for beam redirection assembly 120, V''' is rotated to point downwards while H''' is rotated to point to the left. The number of s- and p-polarized reflections is balanced for both V''' and H''' in assembly 120. Ray D then exits assembly 120 and re-enters prism 20 of subassembly 210. It undergoes two more reflections at base 22 of prism 20 and at base 232 of prism 230 and exits prism 230 normal to side 236. For these two reflections, V''' is rotated to point left and H''' is rotated to point down. Both polarization components undergo one p-polarized reflection and one s-polarized reflection.

When ray D exits prism assembly 210, both V''' and H''' have been rotated in the same direction by 90° and they have both undergone an equal number of sand p-polarized reflections. Therefore, any entering polarization field will be rotated by 90° and will remain linearly polarized.

Figure 11:
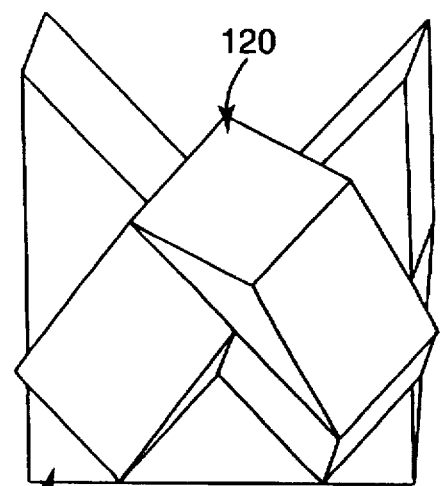
FIG. 11 is an isometric view of an alternative embodiment of the assembly of optical components shown in FIG. 8.

In an alternative embodiment, subassemblies 120 and 210 could be arranged as shown in FIG. 11. The performance of this embodiment would be similar to that described with respect to FIG. 10.

I claim:

1. A method of rotating the plane of polarization of an electric field, E, of an incident beam by 90° while allowing the beam to continue along undisplaced and in the same direction of travel, comprising the steps of:

providing a beam having a plane of polarization of an electric field, E, having a horizontal component, H, and a vertical component, V, and traveling in a first direction toward and normal to a portion of an optical assembly;

reflecting the beam from the first direction to a second direction which is perpendicular to the first direction and then reflecting the beam from the second direction to a third direction which is normal to a plane defined by the first and second directions, wherein H and V each undergo one s-polarized reflection and one p-polarized reflection;

retroreflecting the beam from the third direction to a fourth direction opposite the third direction, wherein the plane of polarization of E is reflected across a plane which bisects H and V, wherein H and V each undergo two s-polarized reflections and two p-polarized reflections; and reflecting the beam from the fourth direction to a fifth direction which is opposite the second direction and then reflecting the beam from the fifth direction to the first direction, wherein H and V each undergo one s-polarized reflection and one p-polarized reflection; wherein the number of s-polarized reflections is the same for V and H, and wherein the number of p-polarized reflections is the same for V and H, and whereby the plane of polarization of E is rotated 90° from its original orientation and the beam continues traveling undisplaced from and in the same direction as the first direction of travel.

2. The method of claim 1, further including the steps of:

displacing the beam in the second direction by a distance x; and displacing the beam in the fifth direction by x.

* * * * *